(12) United States Patent
Rigaud et al.

(10) Patent No.: US 9,050,575 B2
(45) Date of Patent: Jun. 9, 2015

(54) THERMOCHEMICAL SYSTEM HAVING A MODULAR CONNECTION

(75) Inventors: Laurent Rigaud, St Laurent (FR); Francis Kindbeiter, Corneilla del Vercor (FR); Laurent Dutruy, Villeneuve de la Raho (FR)

(73) Assignee: COLDWAY, Route de Rivesaltes, Pia (FR)

( * ) Notice: Subject to any disclaimer, the term of this patent is extended or adjusted under 35 U.S.C. 154(b) by 227 days.

(21) Appl. No.: 13/880,560

(22) PCT Filed: Oct. 20, 2011

(86) PCT No.: PCT/FR2011/000565
§ 371 (c)(1),
(2), (4) Date: Jul. 1, 2013

(87) PCT Pub. No.: WO2012/052634
PCT Pub. Date: Apr. 26, 2012

(65) Prior Publication Data
US 2013/0280140 A1    Oct. 24, 2013

(30) Foreign Application Priority Data

Oct. 20, 2010    (FR) ..................................... 10 04118
Oct. 20, 2010    (FR) ..................................... 10 04119

(51) Int. Cl.
*F25B 15/04*    (2006.01)
*F25B 35/04*    (2006.01)
*B01J 10/00*    (2006.01)
*F25B 17/08*    (2006.01)

(52) U.S. Cl.
CPC ....... *B01J 10/00* (2013.01); *B01D 2259/40096* (2013.01); *F25B 17/08* (2013.01); *F25B 35/04* (2013.01); *F25B 2333/002* (2013.01); *Y02B 30/62* (2013.01)

(58) Field of Classification Search
CPC ..................... B01D 53/05; B01D 2259/40096; B01J 10/00; Y02B 30/62; F25B 17/08; F25B 2333/02; F25B 35/04
USPC ....................... 96/139, 146, 152; 422/177, 187
See application file for complete search history.

(56) References Cited

U.S. PATENT DOCUMENTS 4,374,094 A * 2/1983 Farnham ........................ 422/218
4,859,427 A * 8/1989 Konishi et al. ................. 422/159
(Continued)

FOREIGN PATENT DOCUMENTS

EP    0 015 106 A1    9/1980
FR    1 029 877 A    6/1953
(Continued)

*Primary Examiner* — Frank Lawrence
(74) *Attorney, Agent, or Firm* — Sughrue Mion, PLLC

(57) ABSTRACT

A thermochemical system having a reactor or a chamber for storing a reactive material capable of absorbing a gas that is taken into the reactor by a diffuser placed along the longitudinal axis of the latter. The reactive material and the gas are such that, when placed in the presence of each other, same are subjected to a reaction causing the reactive material to absorb the gas, and conversely, same are subjected to a reaction for desorbing the gas, absorbed by the reactive material, by heating applied to the latter when it has absorbed gas. The diffuser includes a gas supply mechanism, a mechanism for dispensing the gas into the reactive material, a filtration mechanism, and a heating mechanism. The various mechanisms form a sub-assembly that is attached onto the housing of the reactor by a sealing element.

22 Claims, 4 Drawing Sheets

(56) References Cited

Figure 2A:
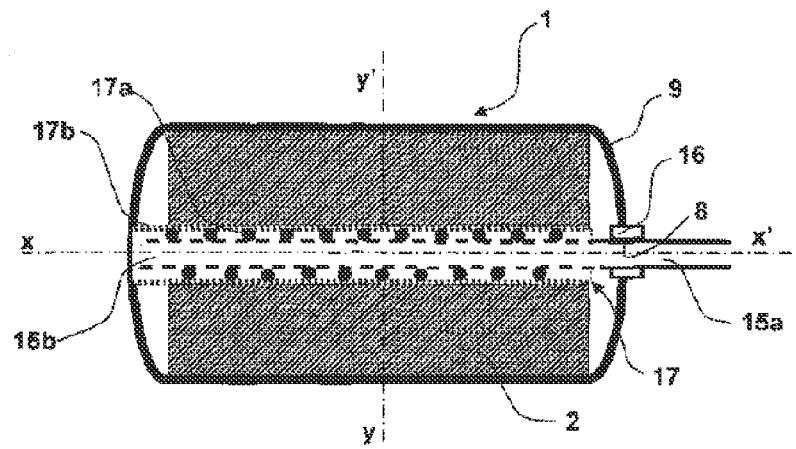

U.S. PATENT DOCUMENTS 5,160,355 A * 11/1992 Toppel .............................. 96/146
6,267,229 B1 * 7/2001 Heung ........................... 206/0.7

FOREIGN PATENT DOCUMENTS

| FR | 2 736 421 A1 | 1/1997 |
| WO | 97/14004 A1 | 4/1997 |

* cited by examiner

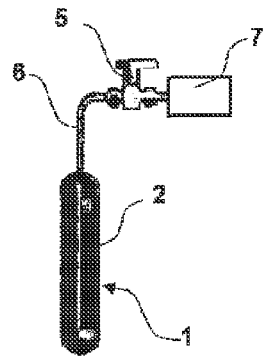
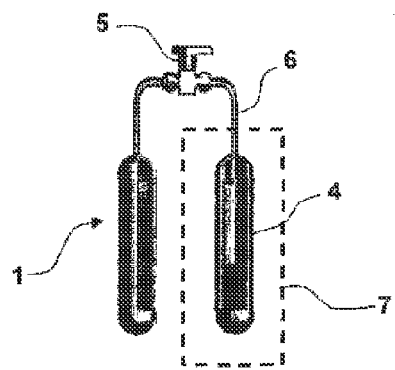
FIG 1          FIG 4
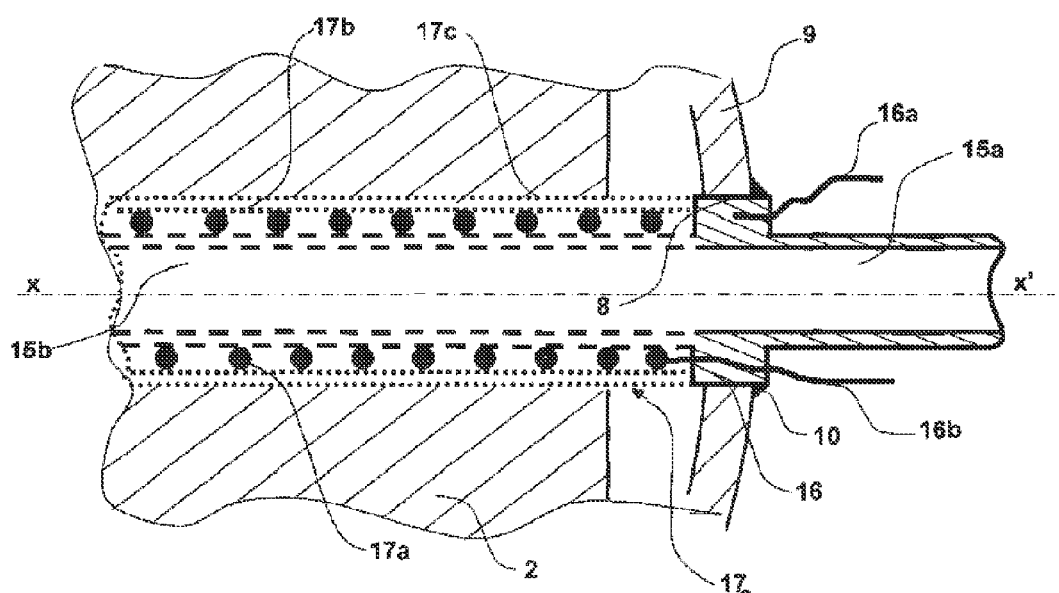
FIG 2b
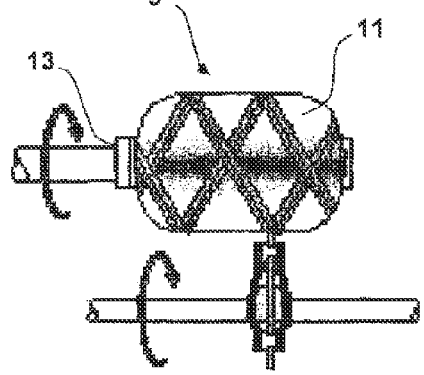
FIG 5

THERMOCHEMICAL SYSTEM HAVING A MODULAR CONNECTION

CROSS REFERENCE TO RELATED APPLICATIONS

This is a National Stage of International Application No. PCT/FR2011/000565 filed Oct. 20, 2011, claiming priority based on French Patent Application Nos. 1004118 filed Oct. 20, 2010 and 1004119 filed Oct. 20, 2010, the contents of all of which are incorporated herein by reference in their entirety.

The present invention relates to improvements in thermochemical systems of the type intended to be used in particular in refrigeration and/or heating systems as well as gas storage in salt form.

Such systems are known which exploit the properties of a highly exothermic reversible thermochemical reaction in which a reaction product, such as salts and in particular calcium chloride or barium chloride, absorbs a suitable gas, such as ammonia in particular. The reversibility of this reaction can, once it is completed, retrieve the original gas by heating the salts, so that the cycle can repeat.

This property, as explained in the patent FR 2,873,793, has been used in cold production systems where the thermochemical system is brought into controlled communication with a tank containing the gas in liquid phase. When the two chambers are brought into communication, the liquid gas in the tank evaporates, which absorbs a certain amount of heat, so that the tank is cooled, and the gas is absorbed by the reaction product thereby generating the above chemical reaction, so that the reactor is a source of heat. Once the reaction is complete, if the product contained in the reactor is heated, it releases the absorbed gas in the reaction product thereof and then condenses in the tank.

One can also use this system to ensure the storage of gas employed in the aforementioned thermochemical reaction.

In practice, the systems include a thermochemical reactor containing the reaction product into which the gas is brought by means of an element, hereinafter known as a diffuser.

Such a diffuser is able to perform several functions, namely firstly to achieve a homogeneous distribution of gas in the mass of the reactive product, and secondly to ensure that this diffusion takes place in an axial direction. It has indeed been found that heating the reaction product was more homogeneous when the heating current lines were radial, i.e., when they extended from the center to the periphery of the reactor.

Reactors should furthermore comprise filter means to prevent, when the reactor is placed in communication with the tank, small reaction product particles being sucked in and blocking the control circuit. These filtering means usually consist of one or more filter elements, for example stainless steel, having a porosity such as to prevent the passage of particles of reactive product into the gas circuit.

The reactors should finally be provided with means for heating the product contained in the reactor after the reaction product has absorbed the gas, so as to be able to activate the reverse thermochemical reaction.

As a result, the realization of a reactor, owing to the multiple devices and connections that are rendered necessary by the different functions which it is required to fulfill, is a complex and expensive operation.

The present invention seeks to overcome these drawbacks by proposing a thermochemical system the production of which is such as to reduce the time of manufacture and assembly of the reactor and, in addition, particularly in a variant of the invention, allows centralized and simultaneous setup of the various means for implementing the various functions performed by the reactor, namely gas supply, distribution thereof in the reaction product, heating and filtration.

The present invention thus relates to a thermochemical system of the type comprising a reactor or a storage enclosure of a reaction product capable of absorbing a gas, which is admitted into the reactor through a diffuser arranged along the longitudinal axis thereof, wherein the reaction product and the gas are such that when placed in the presence of each other they undergo a chemical reaction with the effect of absorption of the gas by the reaction product and conversely, they are subject to a reverse chemical reaction of desorption of gas absorbed by the reaction product under the effect of heating applied to the latter when it has absorbed gas, characterized in that the diffuser comprises gas supply means for distributing the gas in the reaction product, filtering means, and heating means, wherein these means form a subassembly which is fixed to the casing of the reactor through a closure element.

Preferably the shape and volume of said subassembly are such that it will be capable of being introduced into the reactor through a port which is closable by the valve member, once introduction has been performed.

This subassembly may have an overall cylindrical shape and the maximum diameter of the various means constituting the subassembly may be smaller than that of the valve member.

The subassembly can be removably fixed to the reactor, in particular by screw fittings.

In addition, the heating means may be constituted by the means of distribution of the diffuser.

In such an embodiment, the distribution means of the diffuser forming the heating means may be constituted by a rigid spiral wire heating element, in particular of stainless steel, which is supplied with gas at one of its ends by a gas inlet tube.

The end of the wire element supplied with gas may be integral with the gas feed pipe, in particular by welding or by a force fit.

The heating means may be constituted by at least one resistor, in particular substantially helically wound on the distribution means of the diffuser.

The latter may be covered by at least one filter element, in particular made of stainless steel. Preferably at least one filter element has a mesh size, the size of which will be on the order of ten micrometers. At least one of the filter elements may have a mesh the size of which is on the order of some hundred micrometers. According to the invention, the resistance may be arranged on said filter element.

Preferably, the filter means completely envelop the means of distribution of gas to prevent microparticles of reactive product from blocking the gas circuit.

Moreover, the casing may be made of metal including stainless steel, but may also be made of composite materials. Its inner surface may be lined with a second chamber, or "liner" containing the reaction product.

In an application of the "closed" type, the thermochemical system may comprise means for controlled communicating between the reactor and a tank containing said gas in liquefied form.

Figure 3:
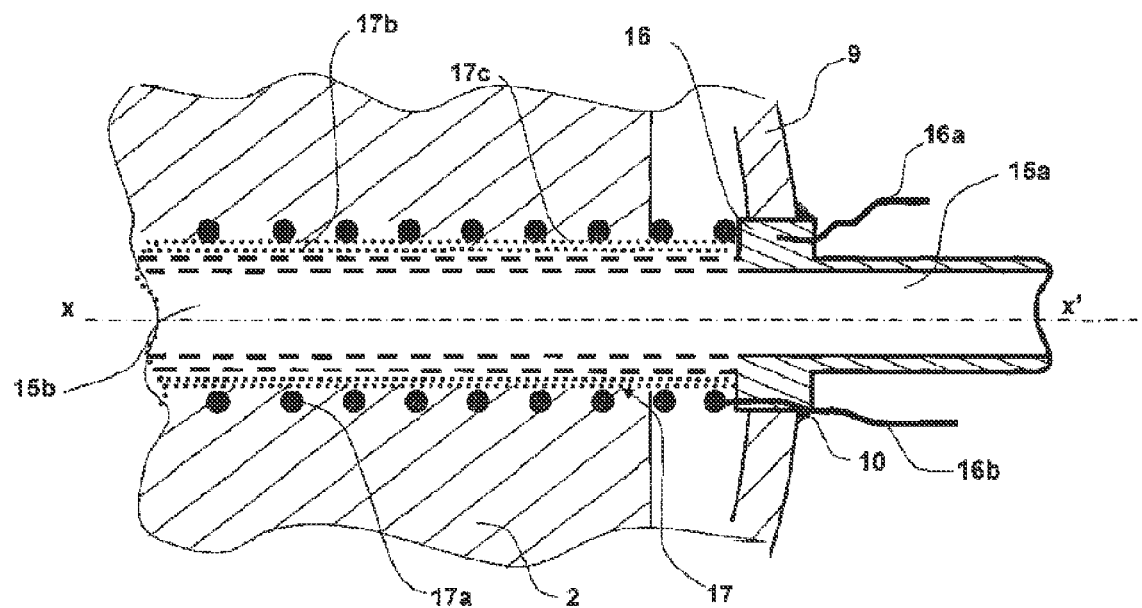
Figure 6:
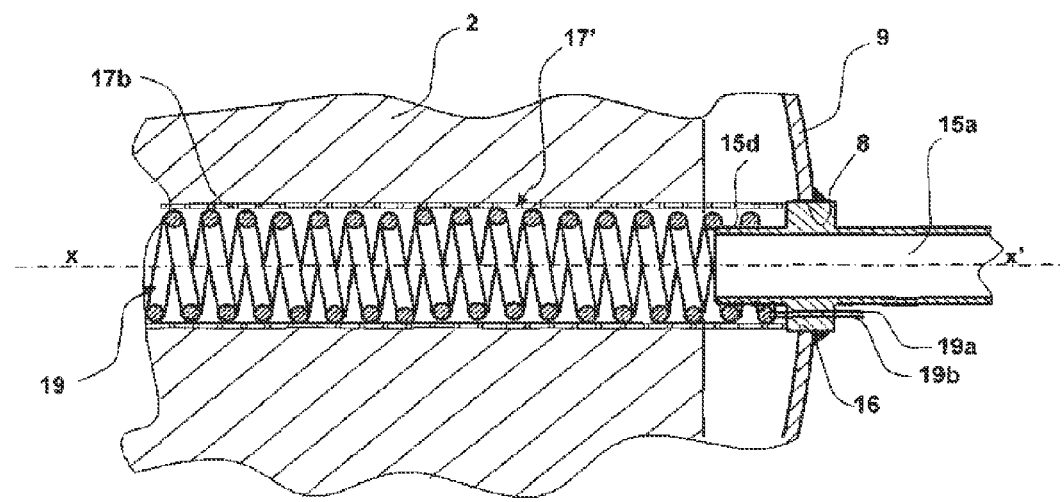
Figure 7:
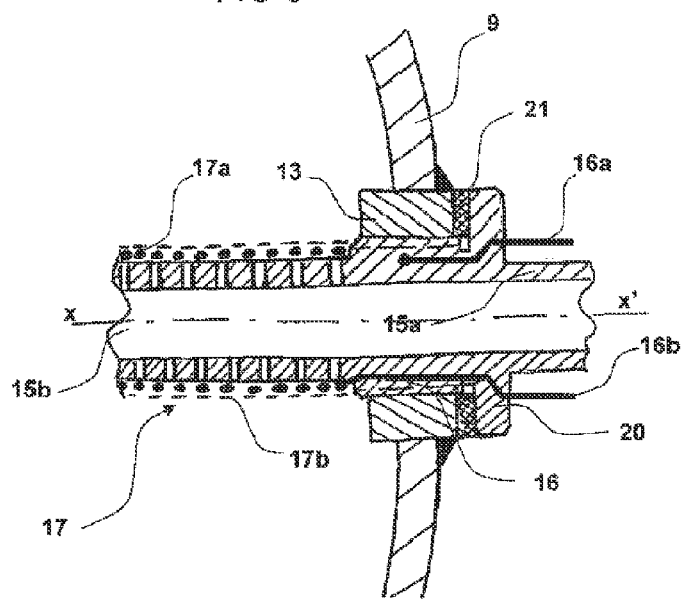
Figure 8:
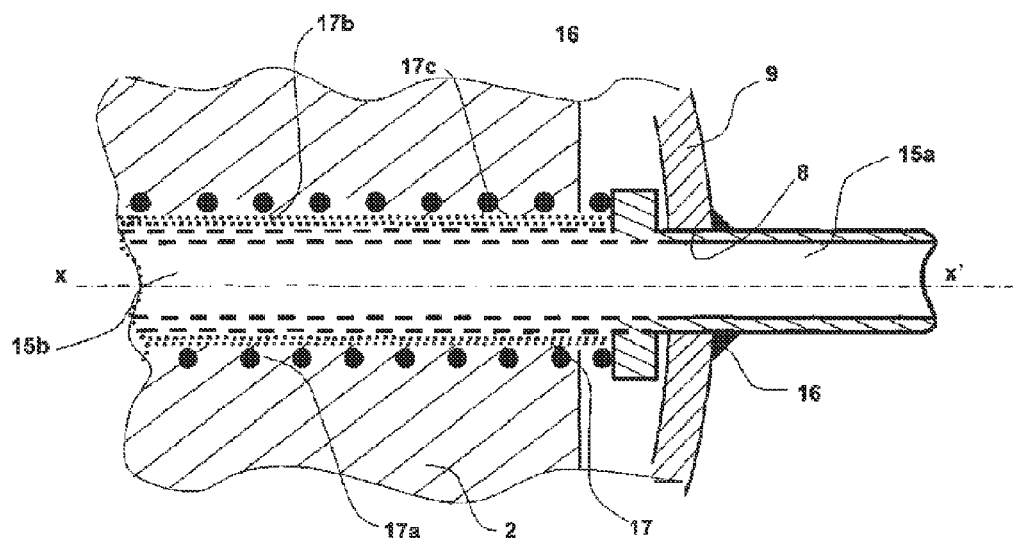

An embodiment of the present invention will be described below by way of a non-limiting example, with reference to the accompanying drawings in which:

FIG. 1 is a schematic view in partial section of the reactor, illustrating the operating principle of a thermochemical system according to the invention in an application of the so-called "open" type, FIG. 2a is a schematic longitudinal section and diametric view of a first embodiment of a reactor used in the inventive thermochemical system, FIG. 2b is an enlarged partial view of a diffuser shown in FIG. 2a, FIG. 3 is an enlarged partial view of an alternative embodiment of the diffuser shown in FIG. 2b, FIG. 4 is a schematic view in partial section of the reactor, illustrating the principle of operation of a thermochemical system according to the invention in an application of the so-called "closed" type, FIG. 5 is a schematic view illustrating a method of manufacturing a variant of a reactor used in a thermochemical system according to the invention, FIGS. 6, 7 and 8 are partial views in longitudinal and diametric section of three embodiments of the invention, In a first embodiment of the invention, the thermochemical system shown schematically in FIG. 1 essentially comprises a reactor 1, which contains a reactive product 2 which is connected via a line 6 under the control of a control valve 5 with external means of use 7. As explained below and as is known, the reactant and the specific gas are such that the reaction product is capable, by a thermochemical exothermic reaction, of absorbing the gas and subsequently restoring the latter by a reverse thermochemical reaction, when the reaction product 2 is heated.

In the present embodiment of the invention which is shown in FIGS. 2a and 2b, the reactor 1 comprises a cylindrical outer casing 9 which ends preferentially at each end in a substantially hemispherical portion.

In the known manner, the reagent product 2 which is contained in the reactor 1 is, for example, calcium chloride which has preferably been mixed with inert aggregates, e.g. made of expanded natural graphite (ENG) so as to increase the permeability the reaction product and thus promote the diffusion of gas within it. Once the mixture is carried out, it is compacted preferentially in the longitudinal direction xx' of the reactor 1.

One end of the reactor 1 is provided with an orifice 8 for receiving a closure member 16 consisting in this case of a projection of a diffuser 17. The latter thus comprises a gas inlet/outlet pipe 15a which is connected to the means of use 7 and which is continued by the closure element 16 of larger diameter designed to be located in the orifice 8 and to ensure fixing of the diffuser, for example by a welding 10 on the shell 9 of the reactor 1. The diffuser 17 extends inside the reactor 1 over the entire length of the casing 9, by a tubular portion 15b which is perforated so that its porosity is between 10 and 90%.

The primary function of the tubular portion 15b is to promote regular diffusion of the gas throughout the length and in the mass of the reaction product 2. It also has a second function which is to ensure this gas diffusion in the reaction product according to a radial path. It was indeed found that the permeability of the reaction product 2 was optimal in such a direction, to the extent that it is perpendicular to the direction of compaction xx'. In the present embodiment of the invention, the tubular portion 15b of the diffuser 17 furthermore adopts a heating function.

For this purpose a heating wire 17a, preferably stainless steel, is wound on the perforated portion 15b of the diffuser and its power supply 16a and 16b pass through the valve element 16 leading to an external power supply not illustrated in the drawing.

The heating wire 17a is covered by a cylindrical sleeve 17b, particularly made of stainless steel, the mesh size of which is preferably on the order of ten micrometers. This assembly is possibly slid in turn inside a second cylindrical sleeve 17c made of stainless steel mesh of greater porosity and with mesh dimensions preferably on the order of a some hundred micrometers. Both sleeves 17b and 17c abut against the valve member 16 at one of their ends and at their other end, they come into contact with the bottom of the reactor, so as to isolate the gas inlet/outlet of the reaction product 2 and prevent the microparticles thereof from blocking the control elements 5. It will be ensured that the diameter of the second sleeve 17c is smaller than that of the closure member 16 to allow it to enter the reactor through the orifice 8.

According to the invention, a diffuser 17 is therefore realized which forms a subassembly comprising all the elements needed to carry out the various functions listed above, namely gas supply, distribution, filtration and heating the reaction product, with this subassembly subsequently being mounted on the casing 9 by means of the closure member 16 once the reaction product 2 has been introduced into the reactor. It can be seen that installation of the reactor is greatly simplified since all the elements constituting the diffuser subassembly can be pre-assembled and implemented centrally and simultaneously i.e. in a single handling operation.

One could also, as shown in FIG. 3, have the heating wire 17a on the outside of the subassembly, namely on the second filter element 17c.

The thermochemical system according to the invention, which is shown in FIG. 1 can be used to perform several functions leading to various technical applications.

Thus, when the utilization means 7 are constituted by a source of gas, one can use the thermochemical system to ensure storage thereof. This function leads to several applications.

The reactor may indeed be used to absorb gases that are to be eliminated, including a harmful gas that initially, is stored in the reactor in order to subsequently retrieve it by appropriate means.

The reactor may also be used to store a gas that one wishes to distribute for a specific application.

A particularly interesting application is one in which the thermochemical system is used for the production of heat and cold. In this application, known in itself, which is shown in FIG. 4, the external means of use 7 are constituted by a tank 4 which contains a liquid gas capable of reacting with the reaction product 2 and which is stored in liquid phase.

In the known manner, the function of the system is established as described above. On opening the control valve 5, the gas stored in liquid phase in the tank 4 evaporates, absorbing heat, so that the tank 4 cools, and the gas is distributed by the diffuser assembly 17 in the reagent 2 which captures the product according to the specific thermochemical reaction specific to the reaction product and the gas used; this reaction is exothermic, so that the reactor 1 is heated. The reaction is continued until all the gas in the tank 4 and the reaction product 2 is not saturated. If, subsequently, the reactor 1 is provided with heat by means of heating means, particularly formed by the heating wire 17a, the reaction product 2 desorbs the gas which returns to the tank 4 where it condenses.

For example, in the case of a reaction product consisting of calcium chloride and a gas consisting of ammonia, the thermochemical reaction is:

$$Ca(NH_3)_6Cl_2 <-> Ca(NH_3)_2Cl_2 + 4(NH_3) - 5\delta_R$$

It can be seen that such a system is particularly interesting in that it can potentially store both heat (heating of the reactor 1) and cold (cooling of the tank 4) and moreover with a low weight and reduced dimensions.

The casing 9 of the reactor 1 may be made of a material other than steel or stainless steel. In the context of the present invention, this shell may also consist of a composite material particularly formed of a woven network of carbon fibers, glass fibers or a synthetic material such as in particular Kevlar etc. . . . , which is embedded in a thermosetting or thermoplastic resin such as, for example, an epoxy resin, polyester or polyamide.

In such an implementation, the inner surface of the outer shell of the reactor 1 is in contact with a second casing, or inner casing 11, the so-called "liner", which has the characteristic of being watertight.

This casing may be made of metal and be made of steel, stainless steel, aluminum or a synthetic material such as polyethylene, polyamide etc. . . .

When the casing is metallic, its thickness will be limited, less than 1 mm. Its quality and basic function will be to ensure perfect sealing of the reactor as well as in respect of gas in respect of the liquids used.

The function of the outer composite shell is in turn to give the reactor a good mechanical strength and, to this end, the person skilled in the art will select the nature of the fibers and the resin used and the thickness to be given to the walls of the casing.

In one implementation of such an embodiment, shown schematically in FIG. 5, the liner 11 may be used as a mandrel for producing the external casing 9. Thus one may wind the carbon fibers on the outer surface of the liner 11 set in rotation, so as to build a form of skein on the latter which will be subsequently or simultaneously with winding embedded in the epoxy.

It is also possible, as shown in FIG. 6, to produce a diffuser 17' forming a sub-assembly according to the invention which comprises a spiral heating wire 19, supplied with electric current by wires 19a and 19b which pass through the closure element 16 and the rigidity of which is such that it allows it to be forcibly press-fitted to a section 15d of the gas inlet/outlet tube 15a and pass through the reaction product 2 from one end to the other throughout the entire length of the latter. Advantageously, the rigid spiral heating wire 19 is covered with a filter sleeve 17b, particularly made of stainless steel, preferably having a porosity on the order of tens of micrometers which is fixed, for example by spot welding, on the above. The assembly is covered if necessary with a second filter sleeve of greater porosity, not shown in the drawing, the value of which is preferably on the order of a hundred micrometers. The diffuser assembly 17' is thus formed.

Naturally, the diameter of the closure element 16 which is positioned in the orifice 8 is greater than that of the sleeve 17c so that the diffuser subassembly can be inserted into the reactor.

In the present implementation of the invention, the porosity of the diffuser, which is preferably between 10 and 90%, will be formed by the space between the coils of the heating wire 19, such that in order to adjust the porosity, it will be sufficient to vary the winding pitch of the heating wire by more or less stretching the rigid spiral wire.

In an alternative embodiment of the present invention, which is shown in FIG. 7, the diffuser 17 is detachably mounted on the casing 9 of the reactor 1. To this end, it has a base 13 which is perforated with a threaded hole intended to receive the valve element 16 which is provided with an additional thread for this purpose. The closure member 16 terminates in a flat outer side 20 that bears against the outer face of the base 13 with the interspersion of a gasket 21. It is thus possible, for example, after a certain time of use, to remove the diffuser 17 for cleaning or replacement of any of its components for a new, more efficient diffuser.

In an alternative embodiment of the present invention shown in FIG. 8, the sub-assembly comprising the gas supply means, the gas supply means, the filter means and the heating means are introduced into the reactor from the bottom thereof, namely, the wall of the housing 9 (not shown in the drawing) opposite the wall, in which the gas inlet/outlet tube 15a gas emerges through the orifice 8. In such an implementation, the closure member 16 consists of the weld which is performed between the outer surface of the casing 9 and the tube 15a.

The invention claimed is:

1. Thermochemical system of the type comprising a reactor, or a storage enclosure of a reaction product capable of absorbing a gas, which is admitted into the reactor through a diffuser arranged along the longitudinal axis thereof, wherein the reaction product and the gas are such that when placed in the presence of each other they undergo a chemical reaction having the effect of gas absorption by the reaction product and, conversely, they undergo a reverse chemical reaction of desorption of the gas absorbed by the reaction product under the effect of heating applied to the latter when it has absorbed the gas, characterized in that the diffuser comprises the gas supply means, means for distributing the gas in the reaction product, filtering means, and heating means, said different means forming a subassembly which is fixed to the casing of the reactor by a closure member.

2. Thermochemical system of claim 1 characterized in that the shape and volume of said sub-assembly are such that it is capable of being introduced into the reactor through an orifice which is closable by the closure member once introduction has been performed.

3. Thermochemical system according to claim 2, characterized in that said subassembly has an overall cylindrical shape and the maximum diameter of the various means constituting the subassembly is less than that of the closure member.

4. Thermochemical system according to claim 1 characterized in that the closure member is detachably fixed on the casing of the reactor.

5. Thermochemical system according to claim 4 characterized in that the closure member is screwed on the casing of the reactor.

6. Thermochemical system according to claim 1 characterized in that the diffuser passes through reaction product from one side to the other.

7. Thermochemical system according to claim 1 characterized in that the heating means are constituted by the distribution means of the diffuser.

8. Thermochemical system according to claim 7 characterized in that the distribution means of the diffuser forming the heating means comprises a rigid coiled wire heating element, which is supplied with gas at one of its ends by a gas inlet tube.

9. Thermochemical system of claim 8 characterized in that the end of the wire element supplied with gas is integral with the tube for supplying gas.

10. Thermochemical system according to claim 1 characterized in that the heating means comprises at least one resistor.

11. Thermochemical system according to claim 1 characterized in that the distribution means of the diffuser are covered with at least one filter.

12. Thermochemical system of claim 11 characterized in that the mesh size of said filter is on the order of ten micrometers.

13. Thermochemical system of claim 11 characterized in that the mesh size of said filter is of the order of a hundred micrometers.

14. Thermochemical system according to claim 12 characterized in that a resistor is arranged on said filter.

15. Thermochemical system according to claim 1 characterized in that the casing is made of composite materials.

16. Thermochemical system according to claim 1 characterized in that the inner surface of the casing is lined with a second chamber containing the reaction product.

17. Thermochemical system according to claim 1 characterized in that the filtering means completely envelop the gas supply means.

18. Thermochemical system according to claim 1 characterized in that it comprises means for controlled communication between the reactor and a tank containing said gas in liquefied form.

19. The thermochemical system according to claim 8, wherein the heating element is stainless steel.

20. The thermochemical system of claim 8 characterized in that the end of the wire element supplied with gas is integral with the tube for supplying gas by welding or by a force fit.

21. The thermochemical system according to claim 1 characterized in that the heating means comprises at least one resistor substantially helically wound on the distribution means of the diffuser.

22. The thermochemical system according to claim 11, wherein the at least one filter is stainless steel.

* * * * *